J. L. SHEPPARD.
APPARATUS FOR RESHAPING AND COMPRESSING PLANTATION COTTON BALES.
APPLICATION FILED OCT. 1, 1913.
1,096,398.
Patented May 12, 1914.
6 SHEETS—SHEET 1.
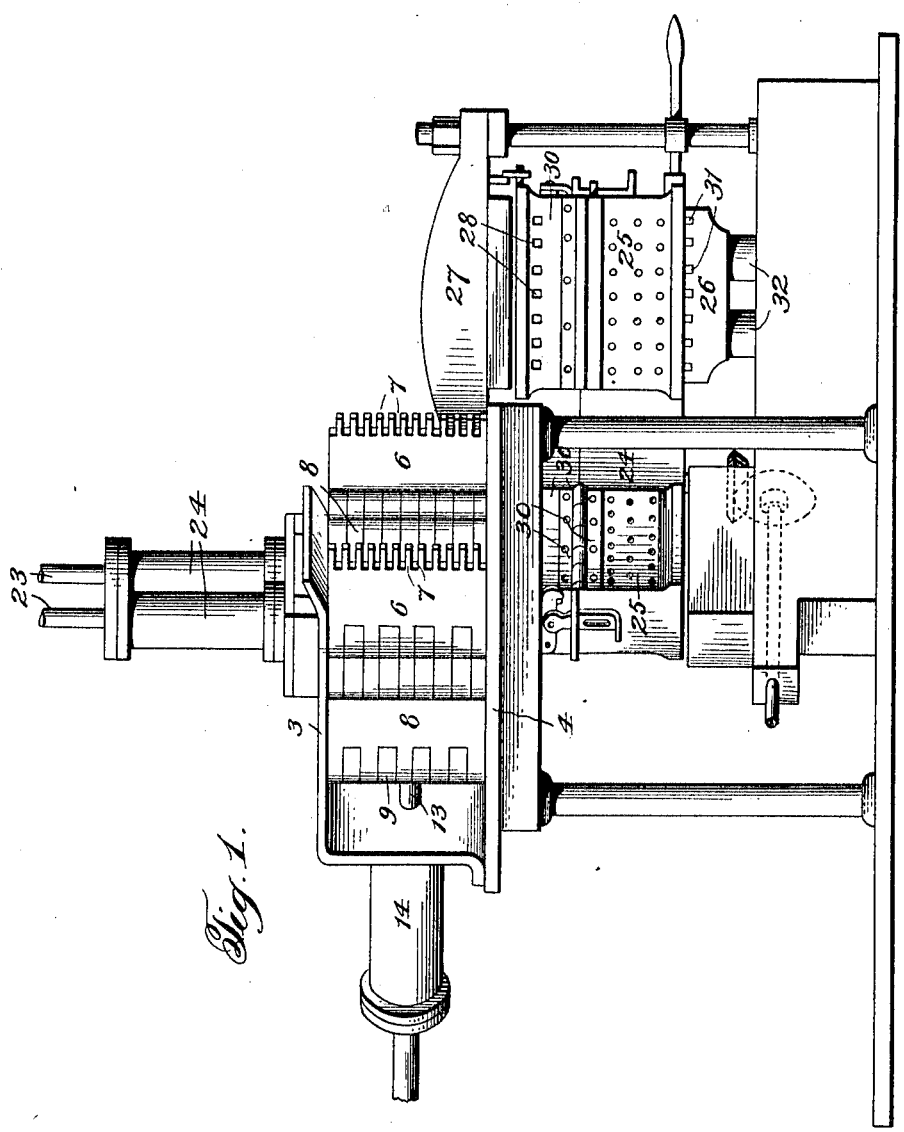

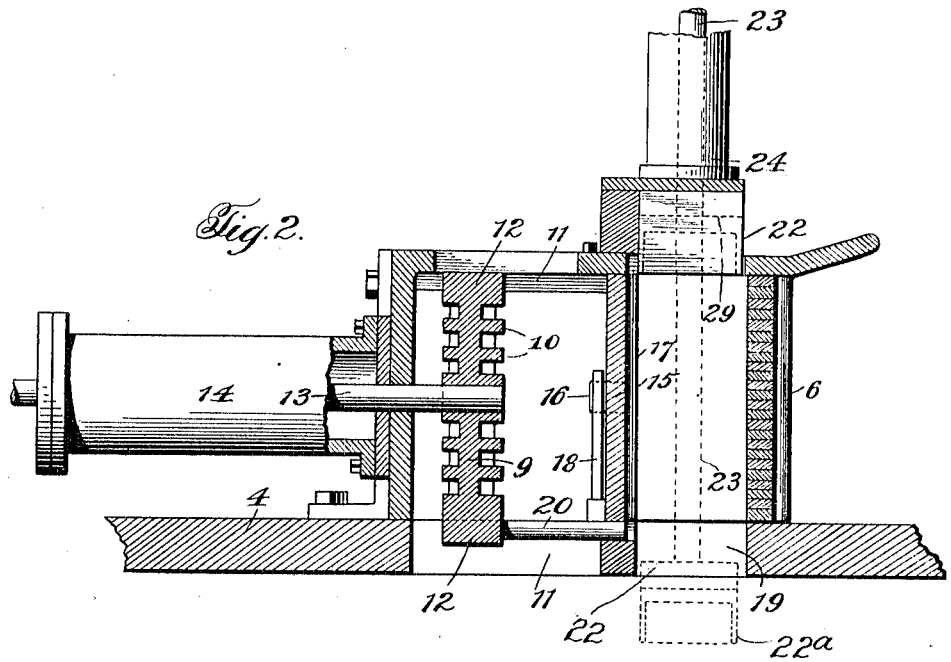
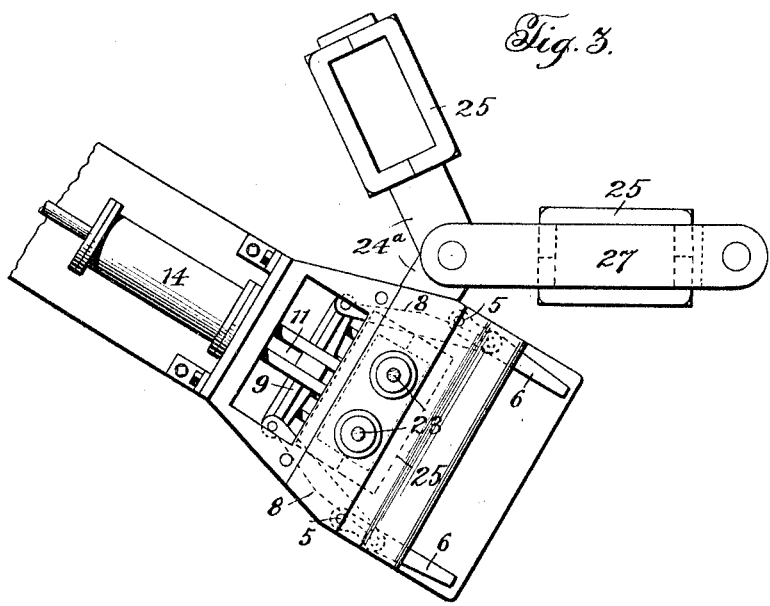

J. L. SHEPPARD.
APPARATUS FOR RESHAPING AND COMPRESSING PLANTATION COTTON BALES.
APPLICATION FILED OCT. 1, 1913.
1,096,398.
Patented May 12, 1914.
6 SHEETS—SHEET 3.
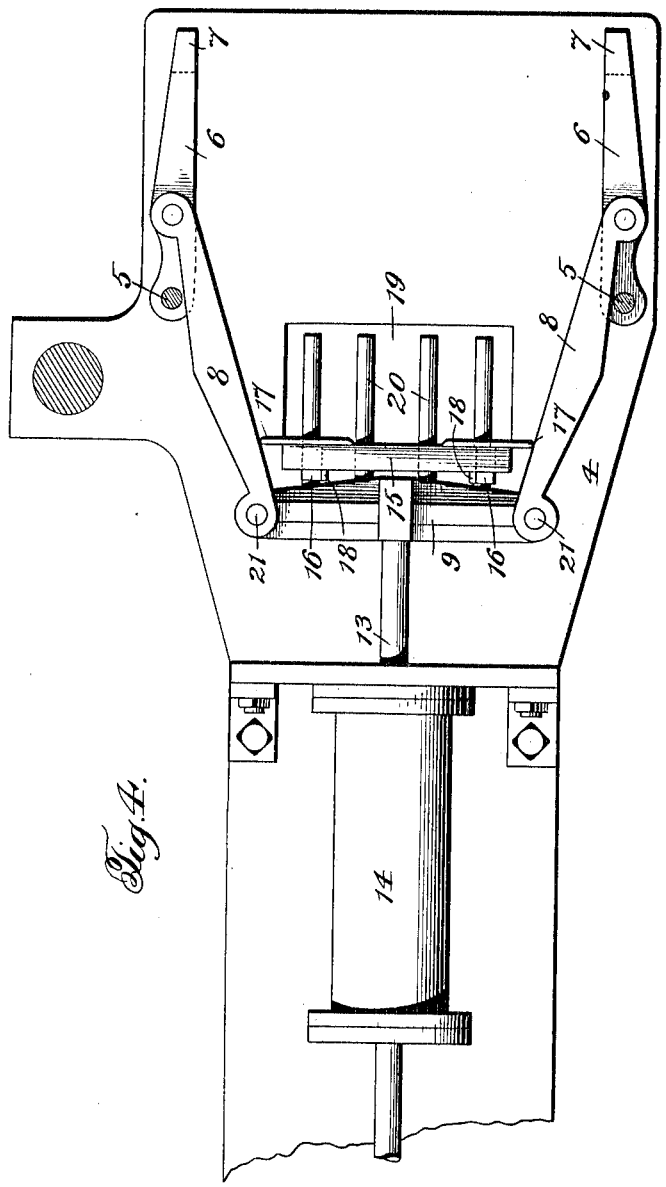
Witnesses:
Inventor:
J. L. Sheppard
By H. A. Seymour Attorneys

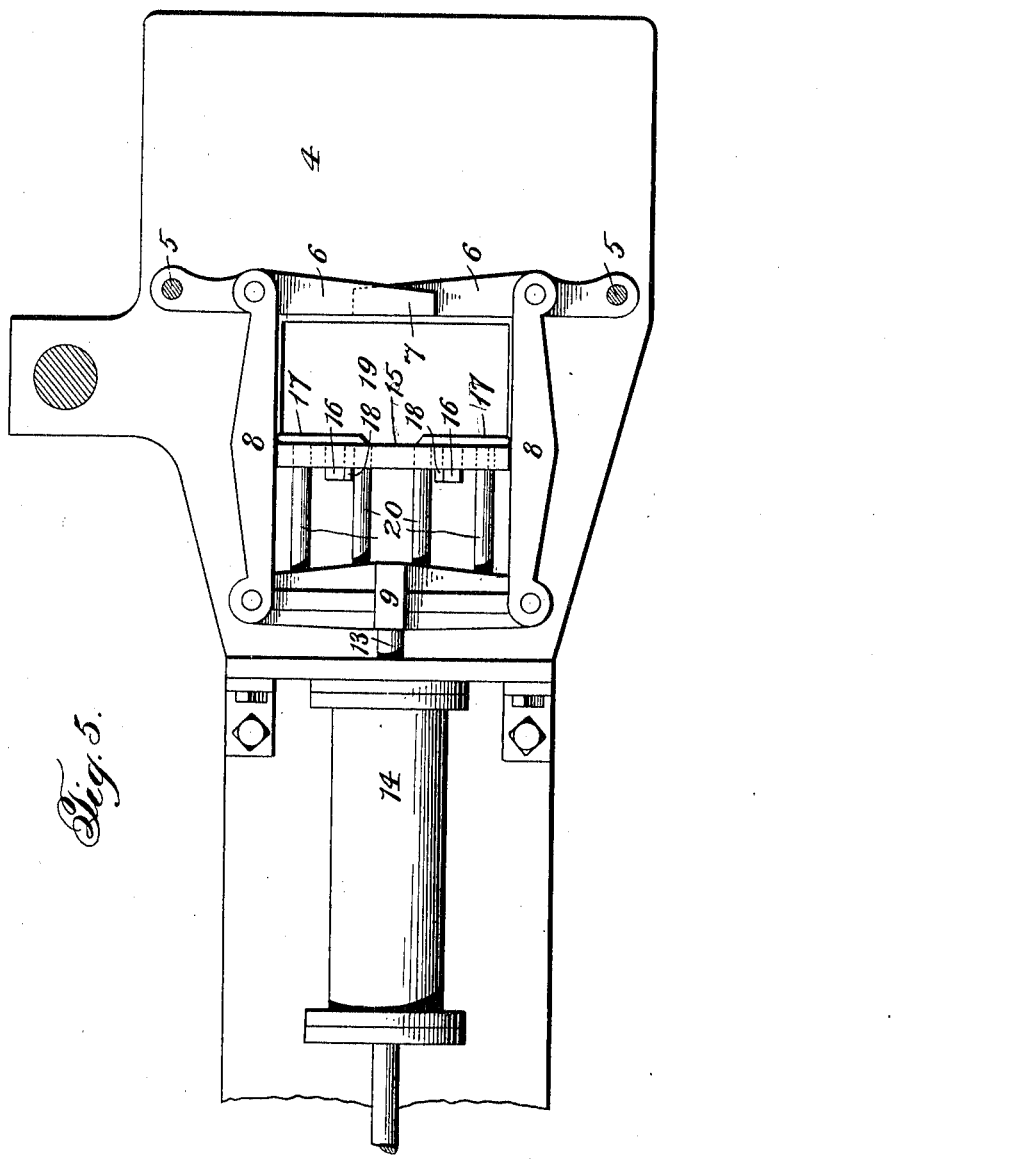

J. L. SHEPPARD.
APPARATUS FOR RESHAPING AND COMPRESSING PLANTATION COTTON BALES.
APPLICATION FILED OCT. 1, 1913.

1,096,398.

Patented May 12, 1914.
6 SHEETS—SHEET 5.

Witnesses:
Jas. E. Hutchins,
G. F. Downing

Inventor:
J. L. Sheppard
By H. A. Seymour
Attorneys

J. L. SHEPPARD.
APPARATUS FOR RESHAPING AND COMPRESSING PLANTATION COTTON BALES.
APPLICATION FILED OCT. 1, 1913.

1,096,398.

Patented May 12, 1914.

6 SHEETS—SHEET 6.

Witnesses:
Jas E. Hutchinson
G. F. Downing

Inventor:
J. L. Sheppard
By H. A. Seymour
Attorneys

UNITED STATES PATENT OFFICE.

JOHN L. SHEPPARD, OF CHARLESTON, SOUTH CAROLINA, ASSIGNOR TO AMERICAN HIGH DENSITY COMPRESS CORPORATION, OF CHARLESTON, SOUTH CAROLINA, A CORPORATION OF SOUTH CAROLINA.

APPARATUS FOR RESHAPING AND COMPRESSING PLANTATION COTTON-BALES.

1,096,398. Specification of Letters Patent. Patented May 12, 1914.

Application filed October 1, 1913. Serial No. 792,787.

*To all whom it may concern:*

Be it known that I, JOHN L. SHEPPARD, of Charleston, in the county of Charleston and State of South Carolina, have invented certain new and useful Improvements in Apparatus for Reshaping and Compressing Plantation Cotton-Bales; and I do hereby declare the following to be a full, clear, and exact description of the invention, such as will enable others skilled in the art to which it appertains to make and use the same.

My invention relates to an improvement in apparatus for reshaping and compressing plantation cotton bales, the object being to provide means for reducing the plantation bales to uniform size as to length and width, and subsequently compressing the reshaped bale in a compress associated with the reshaping press, whereby the reshaped bale may be compressed and tied.

This invention is designed particularly as an improvement on Patent 1,071,811 granted to me September 2nd 1913, and it consists in the parts and combination of parts and in the details of construction as will be more fully explained and pointed out in the claims.

Figure 6:
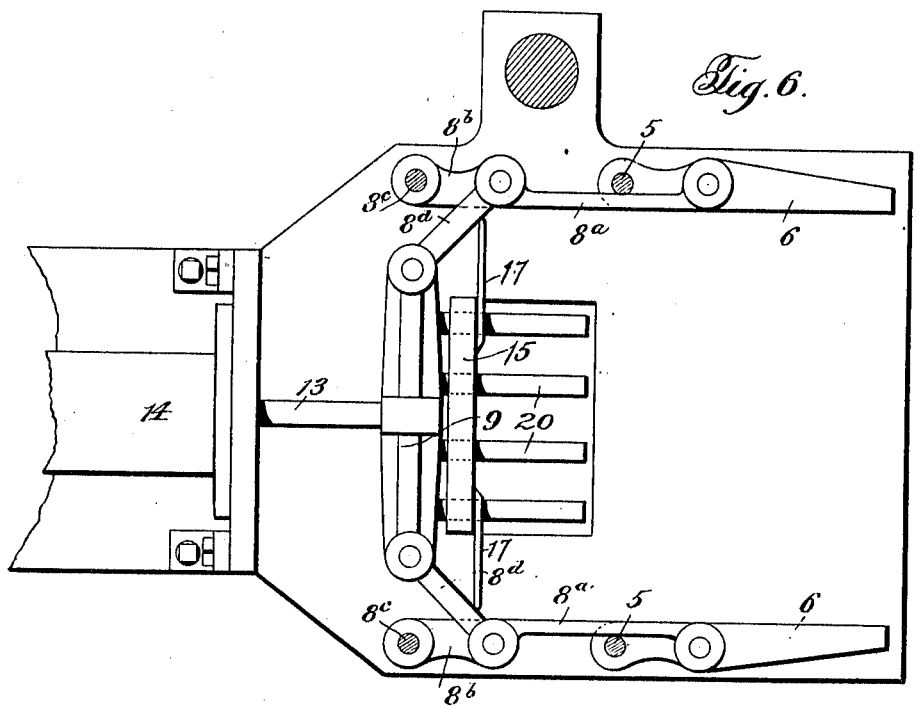
Figure 7:
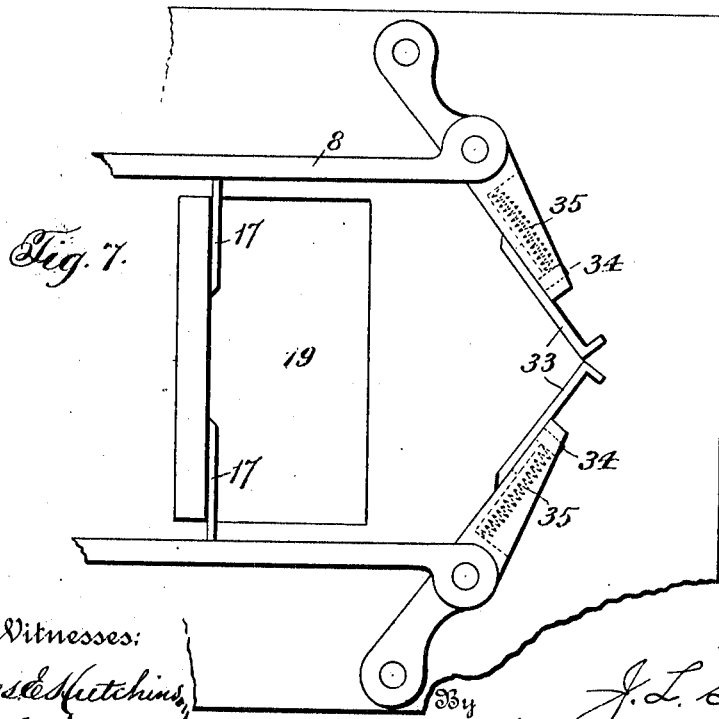
Figure 8:
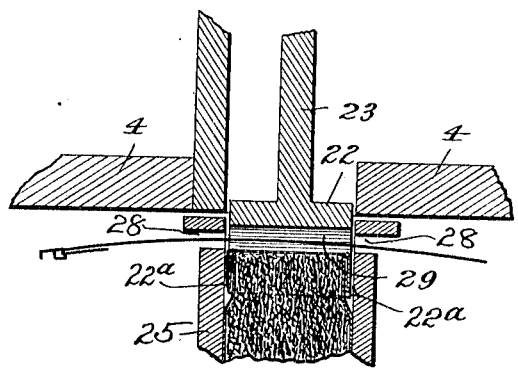
Figure 9:
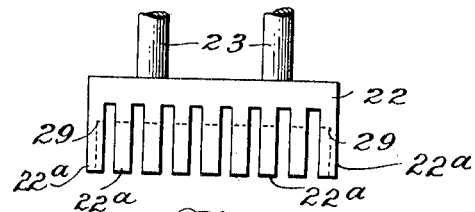
Figure 10:
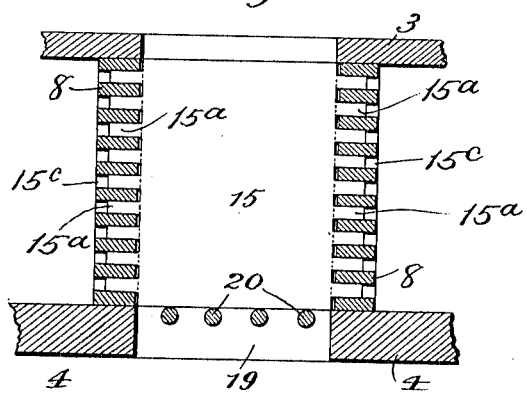

In the accompanying drawings, Figure 1 is a view in elevation of one embodiment of my improvement located over the receiving or compress boxes of a compress; Fig. 2 is a view in vertical section through the reshaping press and showing the plunger for ejecting the reshaped bale; Fig. 3 is a view in plan, showing the gates open; Fig. 4 is a view of the same, the top plate being removed; Fig. 5 is a view similar to Fig. 4 showing the gates in their closed positions, Figs. 6 and 7 are views of modifications, Fig. 8 is a fragmentary view in section showing the bale after it has been forced into a compress box, and the bands inserted over the bale. Fig. 9 is a view in side elevation of the reshaping plunger, and Fig. 10 is a view of a modification of the rear wall and side jaws of the reshaping chamber.

My apparatus comprises a reshaping press located preferably on the floor above the compress. The reshaping press consists of a frame composed of top and bottom plates 3 and 4, the free front end of the top plate being turned upwardly as shown in Fig. 1.

Secured to the top and bottom plates, are the posts 5 on which the gates 6 are mounted to turn. Instead of mounting the gates on the posts, the latter may be fixed to or integral with the gates and have bearings at their ends in the plates. The gates are approximately as wide as the space between the upper and lower plates 3 and 4, and each is preferably reinforced on its outer face with ribs extending in the direction of its length. Each gate is also provided at its free end with slots and fingers 7, the fingers on one gate adapted to enter the slots in the other as the gates approach a closing position. With such construction the free ends of the gates come together prior to final closing and also prior to the time the maximum reshaping pressure is applied to the bales and eliminates an opening or joint between said ends through which the cotton would be forced as the gates approach their closed position, which would be present if the gates simply abutted when in a closed position.

Pivotally connected, preferably by hinge joint connection, to each gear, intermediate the pivot of the latter, and its free end, but nearer the pivot, is a side jaw 8. The two jaws are also as wide as the space between the top and bottom plates 3 and 4, and each is pivotally connected, preferably by a hinge joint connection, at its rear end to the cross head 9. This cross head is also shown as wide as the jaws, but it need not be so, as a much narrower cross head engaging the two jaws at the centers of the width would be amply sufficient. I prefer to provide the cross head with strengthening ribs 10, extending lengthwise the same as shown in Fig. 2.

The top and bottom plates 3 and 4, have guide ways 11 in which projections 12 at the top and bottom of the cross head rest and move, and the cross head is secured centrally to the front end of the plunger 13, in cylinder 14, which may be actuated by steam or water in the well known manner.

Located intermediate of the cross head 9, and also intermediate the side jaws 8, is the fixed rear wall 15 of the press chamber. This rear wall 15, is slotted for the passage of the lugs 16, on the end extension 17 of the rear wall, and the rearwardly extending lugs bear against the springs 18, which latter are secured at their lower ends to the lower plate 4 or other part of the apparatus, and operate to normally hold the end extensions in their projected positions against the jaws 8 as shown in Fig. 4. As the jaws move inwardly during the closing movements of the gates, the end extensions 17 of the end wall will be forced toward each other, and as the jaws open, the springs 18 force the said extensions outwardly and cause them to follow up the outward movements of the side jaws.

The lower plate 4 is provided in advance of the rear wall 15, with an opening 19, which conforms as to size, with the length and width of the compressed bale, and also with the compress boxes to be hereinafter referred to.

Mounted in the rear wall of the press box and in the plane of the lower plate 4, is a series of fingers 20, connected at their rear ends to the cross head 9. These fingers are approximately as long as the opening 19 is wide, so that when they are projected as in Fig. 4, they will form a rest for the plantation bale during the operation of reshaping the same. In the opening movement of the gates, which is accomplished of course by a forward movement of the plunger 13, the cross head moves forwardly and carries the fingers into a position over or within the opening 19 as shown in Fig. 4, and in the closing movement of the gates, the fingers are retracted, thus leaving the reshaped bale unsupported below and free to be forced down into the compress box located below and immediately under the opening 19 as shown in Fig. 1.

When the gates are open, they stand approximately parallel and sufficiently separated to permit of the entrance of any ordinary plantation bale. After the bale has been properly placed between the jaws 8, the plunger 13 is moved rearwardly and the cross head 9 moving with the same, pulls the jaws 8 rearwardly. As the latter begin to move, their attachment to the gates 6, causes the latter to turn inwardly, the fingers 7 at the free ends of the gates coming together and intermeshing, some little time before the parts reach their final positions. As the gates close, the jaws 8 swing inwardly on the pivots 21, and bearing against the ends of the bale force the ends toward each other, while the inwardly moving gates 6, and the rear wall 15 of the press chamber, reduce the width of the bale to that of the size of the opening 19, or smaller than said opening but as the bands were previously removed from the plantation bale the mass of cotton is comparatively free to flow and conform itself to the shape of the reshaping press chamber. While the jaws 8 are turning on the pivots 21, they are also being pulled rearwardly, which movement is not fully completed until the gates 6 have fully closed. As the jaws 8 swing toward each other they force the end extensions 17 of the rear wall toward each other, and pull the gates 6 back toward the rear wall 15, so that when the gates have fully closed, they, together with the rear wall 15, and jaws 8, form the sides and ends of a rectangular press chamber which reshape the bale to conform to the length and width of the compress boxes. The rearward movement of the cross head withdraws the fingers 20 from beneath the bale. This withdrawal is however gradual and co-extensive with the closing movement, so that before the fingers have been fully withdrawn, as to leave the bale unsupported below, the bale will have been gripped by the gates and jaws, and held by the latter until forced out by the plunger 22. As the free ends of the gates 6 approach each other, the fingers 7 at the ends thereof intermesh and thus prevent the cotton, or the bagging covering the bale, from entering between the free ends of the gates, which would not only interfere with the full closure of the gates, but would interfere with the ejection of the reshaped bale into the compress box. As the closing movement continues, the jaws 8 compress the bale endwise, while the gates 6 coacting with the fixed rear plate 15 reduces the width of the bale so that when the gates are fully closed as in Fig. 5, the bale will be reshaped as to length and width, to conform to the shape of the compress box, into which it is ejected by the platen 22, on plungers 23, which latter are within the cylinders 24 supported above the top plate 3, the plungers being actuated by air, steam or water as may be preferred.

Located below the reshaping press is the frame 24 carrying a series of compress boxes 25. In the present instance I have shown three boxes but I may use more than three. The frame 24 is mounted to turn, and the boxes thereon are so located that when one box is under the reshaping press, another will be over the platen 26 of a compress and under the head 27 of the latter, so that one bale may be compressed while another is being reshaped, the third compress box 25 being free of both presses and in a position to permit the compressed bale therein to be readily removed.

The construction and operation of these compress boxes are fully disclosed in my Patent 1,071,811 granted to me September 2nd, 1913, hence need not be more specifically described herein.

After the plantation bale, stripped of its bands has been forced into the compress box and while under the pressure of the ejector plunger 22, (see Fig. 8) the bale bands for the compressed bale are passed through the holes 28 in the hinged top sections of the compress box and through grooves 29 in the under side of the ejector plunger 22 over the cotton, and the box is moved with the bands so placed, around to the compress plunger.

After the cotton has been compressed, and while it is still under compression, but after the hinged sides 30 of the compress box have been forced open, the bands are passed through the grooves 31 in the platen 26, under the bale and secured in the usual manner by ties, after which the compress plungers 32 carrying platen 26 are lowered, thus permitting the box 25 with the compressed and tied bale therein, to be moved clear of the compress and if desired against ejectors which will roll the bale from the box, after which the hinged sides 30 are closed by hand or otherwise and the box is again ready for its turn under the reshaping press.

The plantation bales are inclosed in a covering known as bagging, and when the bale is reshaped, there is of course an excess of bagging which must be taken care of. The friction of the bagging against the sides and ends of the opening through plate 4, when the bale is being pushed through this plate pulls the bagging tightly against the bottom, sides and ends of the bale, and carries the surplus toward the top. In order to take care of this excess on the top or underside of bale, I provide the plunger 22 with flanges or fingers 22ª at both sides and ends, which project below the bottom of the plunger, and operate to push the excess of bagging down against the sides and ends at the top. At the sides these flanges are slotted to conform to the bale band slots in plunger 22, as shown in Figs. 8 and 9 but at the ends they are preferably without slots.

Instead of providing the rear wall with sliding end extension 17 as previously described the rear wall 15 may be provided at its two sides with the fingers 15ª as shown in Fig. 10, which register with slots 15ᶜ in the side jaws 8 and effect a closure between the jaws and rear wall, when the jaws are open and also during and after the closing or compressive movement.

In the construction shown in Fig. 6, the jaws 8ª, instead of being hinged directly to the cross head, as are the jaws 8 in the construction previously described, have a hinged connection with the links 8ᵇ which latter are journaled at their rear ends on the posts 8ᶜ, secured to the top and bottom plates 3 and 4, and are connected to the cross head 9 by the links 8ᵈ, which latter have hinge connection at one end with the cross head 9, and similar connection at their forward ends at the joint between the jaws 8ª and the links 8ᵇ. As the links 8ᵇ, between the pivots of the latter, are approximately as long as those portions of the gates 6 between their pivots 5 and the point of attachment of the jaws 8ª, it will be seen that in the closing movement of the gates, the jaws which are parallel when the gates are open, maintain such parallelism during the closing movement of the jaws, hence each imparts a straight thrust evenly against the bale at the ends thereof.

In the construction shown in Fig. 7, I have omitted the intermeshing fingers 7, and substituted sliding closing plates 33, which latter are mounted against the inner faces of the gates and are provided with parts 34 projecting through slots in the jaws and engaged by the springs 35, which latter are located between the strengthening ribs on said gate, and operate to yieldingly hold the plate 33 in the projected position. The outer ends of these plates are bent as shown and normally project some distance in advance of the ends of the gates, so that, as the latter are moved to closing position, the ends of the plates contact with each other, and as the gates continue to close, the plates slide outwardly on their gates, and when the latter are fully closed their ends are in contact. The plates 33, as do the fingers 7, form a closure for the front of the press chamber in advance of the complete closure of the gates and as explained, prevent the bulging or escape of cotton between the abutting ends of the gate.

With this improvement plantation bales of any size and shape, may be readily and quickly reshaped and made of a size to be readily entered into the box of a compress, and compressed to uniform shape and of any desired density obtainable in the compress.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters-Patent, is:—

1. In apparatus for reshaping and compressing plantation cotton bales, the combination of a pair of gates pivoted adjacent their rear ends, side jaws having hinge connection with the gates, means engaging said jaws whereby the gates may be moved to closed position and the jaws moved toward each other, a compress located in a plane below the gates and jaws for compressing the bale after it has been reshaped, and means for forcing the reshaped bale from the reshaping press chamber into the compress below said chamber.

2. In apparatus for reshaping and compressing plantation cotton bales, the combination of a pair of gates, a pair of jaws having hinge connection with the gates, means for actuating the gates and jaws whereby they are caused to close up against a bale and reshape the same, a compress located below said parts and means for forcing the reshaped and pressed bale from between said jaws and gates into the box of the compress.

3. In apparatus for reshaping and compressing plantation cotton bales, the combination of a rear wall, two gates located in advance of said wall and two jaws forming end closures for the space between the gates and the rear wall, the said jaws being connected to the gates, so that as the gates move to closing position the jaws move toward each other, means for moving said jaws and gates and a compress located in a plane below said parts whereby the bale may be ejected from the latter directly into a part of the compress.

4. In a reshaping press, the combination of a pair of swinging gates, a pair of jaws having pivotal connection with the gates and adapted to move toward each other and means for actuating the gates and jaws.

5. In a reshaping press, the combination of a fixed rear wall, front gates, side jaws pivotally connected with the gates and adapted to move toward each other in the closing movements of the gates and means for actuating said jaws and gates, whereby a single stroke rearwardly shortens and narrows the bale.

6. In a reshaping press, the combination of a fixed rear wall having movable end extensions, front gates, side jaws pivotally connected with the gates and bearing against the outer ends of the movable extension of the rear wall and means for actuating said jaws and gates.

7. In a reshaping press, the combination of pivoted front gates, side jaws hinged to the said gates in advance of the pivots of the latter, a movable cross head connected with both side jaws and means for actuating the cross head.

8. In a reshaping press, the combination of pivoted front gates, side jaws hinged to the gates in advance of the pivots of the latter and adapted to move toward each other as the gates move to closing position and a cross head having hinge connection with both of said jaws.

9. In a reshaping press, the combination of top and bottom plates the latter having an opening through same, movable fingers projecting across said opening, gates located between said plates at the front of the opening, jaws having hinged connection with the gates, the said jaws being located adjacent the ends of the opening, and means for simultaneously closing gates, moving the side jaws toward each other and withdrawing the fingers from over said opening.

10. In a reshaping press, the combination of top and bottom plates each having an opening through same in the same vertical plane, movable fingers adapted to project across the opening in the lower plate and form a support for the bale while reshaping same, gates located between the plates in advance of the openings, jaws having hinged connection with the gates, the said jaws being located adjacent the ends of the opening, means for simultaneously closing the gates, moving the side jaws toward each other and withdrawing the fingers, and means passing through the opening in the upper plate for forcing the bale from between said parts and through the opening in the lower plate.

11. In a reshaping press, the combination of gates provided at their free ends with means which effect a closure between them before they are fully closed, side jaws hinged to the gates in advance of the pivots of the latter and means for actuating said gates and jaws.

12. The combination of two pivoted gates provided at their free ends with means which effect a closure between them before they are fully closed, and means for opening and closing the gates.

13. In a reshaping press, the combination of hinged gates each having fingers at its free end, the fingers of each gate adapted to intermesh with the fingers of the other gate, and means for opening and closing said gates.

14. In a reshaping press, the combination of hinged gates each having fingers at its free end, side jaws hinged to said gates, and means for actuating the jaws and gates, whereby when the gates move to a closing position the side jaws will move toward each other.

15. In a reshaping press, the combination of upper and lower plates, hinged gates located between same, a jaw connected at its forward end to each gate and a single means connected with both jaws for actuating the gates.

16. In a reshaping press, the combination of upper and lower plates, hinged gates located between said plates, side jaws hinged at their front ends to said gates, a cross head having hinge connection with both of said jaws and a plunger connected with the cross head for actuating same.

17. In a reshaping press, the combination of upper and lower plates, a rear wall intermediate said plates, hinged gates in advance of said wall, side jaws hinged at their front ends to said gates and extending to the rear of said rear wall and means connected with the jaws for simultaneously actuating them and the gates.

18. In a reshaping press, a press chamber formed of fixed top and bottom plates and a rear wall, and movable front gates and side jaws, the jaws and gates being pivotally connected, and a single means for actuating said jaws and gates whereby they are forced into contact with a bale located within said press chamber.

19. In a reshaping press, the combination with two gates hinged at their rear ends, a side jaw hinged at its front end to each gate, a cross head having hinge connection with both jaws and means for actuating said cross head.

In testimony whereof, I have signed this specification in the presence of two subscribing witnesses.

JOHN L. SHEPPARD.

Witnesses:
DANIEL GILLILAND SHEPPARD,
WM. G. SHEPPARD.

Copies of this patent may be obtained for five cents each, by addressing the " Commissioner of Patents, Washington, D. C."